United States Patent [19]

Turner, Jr.

[11] Patent Number: 4,903,243

[45] Date of Patent: Feb. 20, 1990

[54] MARINE TRANSPONDER SYSTEM

[75] Inventor: John H. Turner, Jr., Cambridge, Mass.

[73] Assignee: Whistler Corporation, Westford, Mass.

[21] Appl. No.: 228,723

[22] Filed: Aug. 4, 1988

[51] Int. Cl.⁴ .............................................. H04B 1/59
[52] U.S. Cl. .......................................... 367/3; 367/2
[58] Field of Search ...................................... 367/2-6; 455/100; 114/365; 441/89, 11, 12; 310/309

[56] References Cited

U.S. PATENT DOCUMENTS

| | | | |
|---|---|---|---|
| 3,860,900 | 1/1975 | Scudder | 367/6 |
| 4,126,822 | 11/1978 | Wahlstrom | 310/309 |
| 4,492,875 | 1/1985 | Rowe | 310/273 |
| 4,763,126 | 8/1988 | Jawetz | 441/12 |
| 4,781,144 | 11/1988 | O'Brien | 114/365 |

Primary Examiner—Thomas H. Tarcza
Assistant Examiner—Daniel T. Pihulic
Attorney, Agent, or Firm—Weingarten, Schurgin, Gagnebin & Hayes

[57] ABSTRACT

A marine transponder system which is selectively activated to produce a predetermined signal pattern of light/sound/radio transmissions for maritime devices and structures such as navigational aids, mooring, docking or slip facilities and/or EPIRBs and other emergency signalling devices. A remote transmitter is used to broadcast an uncoded or coded signal at a predetermined frequency to activate the marine transponder system. The transponder system includes an RF receiver tuned to the predetermined frequency, and optionally a decoder unit for verifying the coded signal. Upon receipt of the transmitted frequency signal, the transponder system causes an omni-directional light-/sound/radio source to be energized to produce the predetermined signal pattern. The marine transponder system may be an add-on adapted for integration with existing navigational buoys, a standalone buoy, a package configured for mounting on a dock, pier or boat, or a package adapted to be mounted on a life vest/-preserver. This system permits quick and positive user identification and location of a desired, unknown locus and avoids continuous power usage.

22 Claims, 1 Drawing Sheet

MARINE TRANSPONDER SYSTEM

FIELD OF THE INVENTION

The present invention is directed to marine navigational and rescue aids, and more particularly to a marine transponder system which is selectively activated in response to a remotely transmitted signal at a predetermined frequency to generate a predetermined signal for maritime use.

BACKGROUND OF THE INVENTION

Marine navigation is a process of piloting a vessel to a destination in a safe and expeditious manner. While sophisticated electronic equipment is available to aid in the navigation of larger vessels, the majority of mariners continue to navigate by using external reference marks.

A mark is any conspicuous object, natural or manmade, which has utility in establishing the position of a vessel or otherwise acting as a navigational aid. To be an effective navigational aid, each mark must be specifically identified and its position accurately known. Buoys, both lighted and unlighted, lighthouses and lightships are artificial marks designed and erected specifically to function as aids to navigation.

Buoys are the most numerous of all artificial aids to navigation. Buoys can function as daymarks based upon their shape, color and number. Some buoys, particularly those identifying turning points and channels, underwater obstructions, or mooring, docking or slip facilities, are provided with lights to facilitate night time navigation. Buoys may also incorporate horns or radio transmitters as navigational signals.

Signal buoys require an internal power source to operate the lighting system. Batteries are typically utilized as the power source for buoys on the basis of cost and maintenance considerations. Batteries are typically hardwired into the signal circuitry of the buoy so that the signal source is continually draining energy from the battery.

Mooring, docking or slip facilities likewise require some type of signal source to facilitate nighttime use. The location of the facility or other factors may make it impractical to run a power line for continuous nighttime energization of the signal source. In addition, continuously operated signal sources used with mooring, docking or slip facilities may have a negative impact on navigation inasmuch as these facilities may not be marked on navigational charts, thereby providing a source of confusion for mariners. Therefore, as a practical matter steady-state signal sources used with mooring, docking or slip facilities are typically battery powered and manually activated for nighttime operation.

EPIRBs are emergency signaling devices located on vessels and/or life vests/preservers which are typically activated in the event of an emergency such as a sinking vessel or man overboard. Since boat-mounted EPIRBs are designed for emergency use, these EPIRBs are typically powered by batteries. For EPIRBs incorporated in flotation devices, design constraints mandate the use of small compact batteries for the power source. Typically, the EPIRB is activated upon the occurrence of a maritime mishap such as a sinking vessel or man overboard.

Battery systems, however, are inherently limited in that the constant power drain upon the battery causes it to become depleted in a short time. A depleted battery cannot effectively function as a power source, and therefore batteries for buoys or docking facilities must be replaced at periodic intervals. Not only is such periodic replacement time consuming, but a navigational hazard exists when any buoy remains unpowered for any length of time. Alternatively, an expensive solar recharging system or cabling must be used to maintain adequate power.

For EPIRBs activated upon occurrence of a maritime mishap, a delay in rescue operations due to unfavorable weather conditions, unknown position of the mishap, or other adverse conditions can result in depletion of the battery power source prior to the arrival of the rescue craft. An inoperable EPIRB can adversely affect the rescue operation by delayinq or precluding the localization of the EPIRB, with concomitant dire consequences for the personnel awaiting rescue.

SUMMARY OF THE INVENTION

To overcome the inherent limitations of prior art marine navigational aids, docking beacons, and EPIRBs and other emergency signaling devices, the present invention is directed to a marine transponder system which is selectively activated in response to a signal transmitted at a predetermined frequency to provide a locating signal. The locating signal may be a visual signal such as a flashing light, an audible signal such as a horn or an RF signal such as a radio-broadcast distress signal. By thus greatly reducing the on-time of the signaling subsystem to the occasions of actual need, the power drain on the battery is minimized and easily compensated by an inexpensive re-charger.

In one embodiment the marine transponder system is an add-on package incorporated into existing buoys such as marine navigation buoys owned and maintained by the U.S. Coast Guard or privately owned buoys used for navigation or mooring. The add-on package may also be configured for mounting on mooring, docking or slip facilities, on boats or vessels, or on conventional flotation gear. In another embodiment the marine transponder system is a standalone buoy which can be moored as a private navigational buoy or used as a buoy to mark mooring, docking or slip facilities.

The marine transponder system of the present invention includes an internal power source, an RF receiver, timing and control means, a signal source and the associated circuitry. Optionally, the marine transponder system may include a decoder. The power source is a battery, and optionally a recharging source such as solar cells or wave-generator may be used in combination with the battery to provide a trickle charge to maintain the battery at an optimal power level.

The RF receiver is tuned to receive a signal on a predetermined frequency from a remote transmitter, either a dedicated transmitter or a marine transceiver. In one embodiment, the RF receiver is tuned to one of the frequencies permitted under FCC Regulations, Part 15, Low Power Devices. For example, commercially available dedicated transmitters such as garage door openers can be used to transmit the activating signal for the marine transponder system. In another embodiment the RF receiver is tuned to a particular frequency within the maritime mobile communications band.

The transmitted signal may be either encoded or unencoded. Unencoded marine transponder systems are responsive to any signal on the predetermined frequency transmitted within the range of the system.

Encoded marine transponder systems, in contrast, are only responsive to signals on the predetermined frequency transmitted within the range of the system which include the proper address code for the system.

Each encoded buoy/docking facility/EPIRB has a specific address, and addresses may be unique to a single buoy/docking facility/EPIRB or a group of buoys/docking facilities/EPIRBs. For example, a group of buoys marking a channel or a single slip facility may all have the same address. The decoder of the marine transponder system examines each RF signal received on the predetermined frequency to determine if the RF signal is addressed to the particular marine transponder system.

If a particular marine transponder system is addressed by the received RF signal, the decoder provides a control signal which causes the signal source to be energized by connecting the power source to the signal circuitry. The powered signal source broadcasts a signal in a predetermined pattern, thus providing a navigation or rescue signal to mariners.

The signal source may be a light source such as a steady or flashing light, an audible source such as a horn, or a radio frequency broadcast. The signal source may radiate an omni-directional signal or may radiate a signal over a specified sector.

Timing and control circuitry is provided to control the energization of the signal source, both by connecting the signal source to the power source upon receipt of the control signal and by automatically disengaging the power source from the signal source after a predetermined time interval. The timing and control circuitry may also be used to selectively energize and de-energize the RF receiver.

The transponder system typically utilizes one or more batteries as a power source. The batteries may be either primary cells or rechargeable. A recharging means such as solar cells or wave action generator may be used in combination with rechargeable batteries.

The marine transponder system of the present invention may provide increased reliability and decreased maintenance costs by selectively activating the signal source only upon receipt of a signal transmitted at the selected frequency of the system. This increases dramatically the longevity of the battery which powers the transponder system as well as the signal source itself. Alternatively, or in addition a more powerful signal source may be used.

BRIEF DESCRIPTION OF THE DRAWINGS

A more complete understanding of the present invention and the attendant advantages and features thereof will be more readily understood by reference to the following solely exemplary detailed description when considered in conjunction with the accompanying drawings wherein.

DETAILED DESCRIPTION OF PREFERRED EMBODIMENTS

Figure 1:
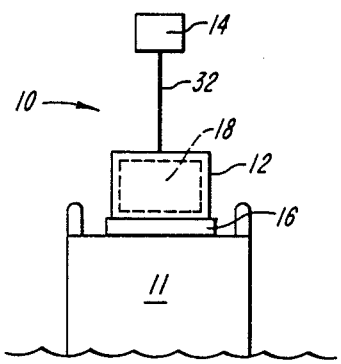
FIG. 1 is a perspective view of a marine transponder system add-on package which is readily incorporated into existing buoys.

Referring now to the drawings wherein like reference numerals designate corresponding or similar elements throughout the several views, there is shown in FIG. 1 a marine transponder system 10 according to the present invention. The marine transponder system 10 of FIG. 1 is an add-on package which is adapted to be mounted to existing buoys or structures 11, and includes a housing 12, an signal source 14 which can be a light source, an audible source or a radio source, mounting means 16, an electronic subsystems 18 disposed within the housing 12, and a RF antenna 32 serving also to support the signal source 14.

Although the housing 12 is illustrated in FIG. 1 as being rectangular in configuration, it is to be understood that the housing 12 can be configured to facilitate mounting to the structure of any existing buoy 11. It is to be further understood that the housing 12 can be configured for mounting to other structures (not shown) such as mooring, docking or slip facilities, boats or vessels, or floatation gear. Thus, while the present description is directed to buoy systems, this is for purposes of explanation only and not intended to be limiting, the features, characteristics and/or operation of the marine transponder system of the present invention also being applicable for use with mooring, docking or slip facilities, boats or vessels, and floatation gear.

The mounting means 16 illustrated in FIG. 1 may be a magnet, but it is to be understood that the mounting means may include bolts, welding or any other means for securely attaching the package to a buoy, dock, pier, boat, vessel or floatation gear.

Figure 2:
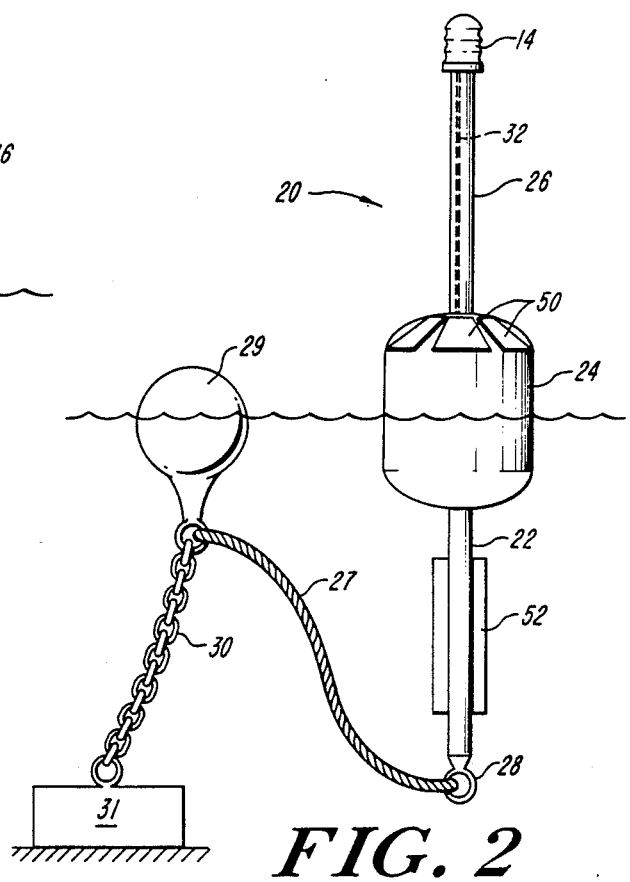
FIG. 2 is a marine transponder system operating as a standalone buoy.

Referring to FIG. 2, there is illustrated another embodiment of a marine transponder system 20 according to the present invention. The marine transponder system 20 of FIG. 2 is configured to operate as a standalone buoy, and includes a suitably weighted lower body pole 22, a float 24, an upper body pole and integrated antenna 26, a weighted mooring eye 28 and a mooring pennant 27 to a float 29 from which a line or chain 30, for anchoring the system stationary in the water, leads to a mooring block 31.

The signal source 14 is attached to the remote end of the upper body 26. The electronic subsystem may be sealed within the lower body 22, float 24, the upper body 26, or any combination thereof. The upper body 26 is typically fabricated from a durable, insulating material such as plastic PVC so that an RF antenna 32 is readily integrated therewith.

The float 24 and weight 28 cooperate to support the marine transponder system 20 in a buoyant manner in the water such that the upper body 26 and the signal source 14 protrude above the water line in a visible manner. The weight 28 affixed to the remote end of the lower body 22, may include stabilization features which function to stabilize the marine transponder system 20 in the water such that the protruding portion of the system is maintained in a stable upright relation with respect to the water surface.

Figure 3:
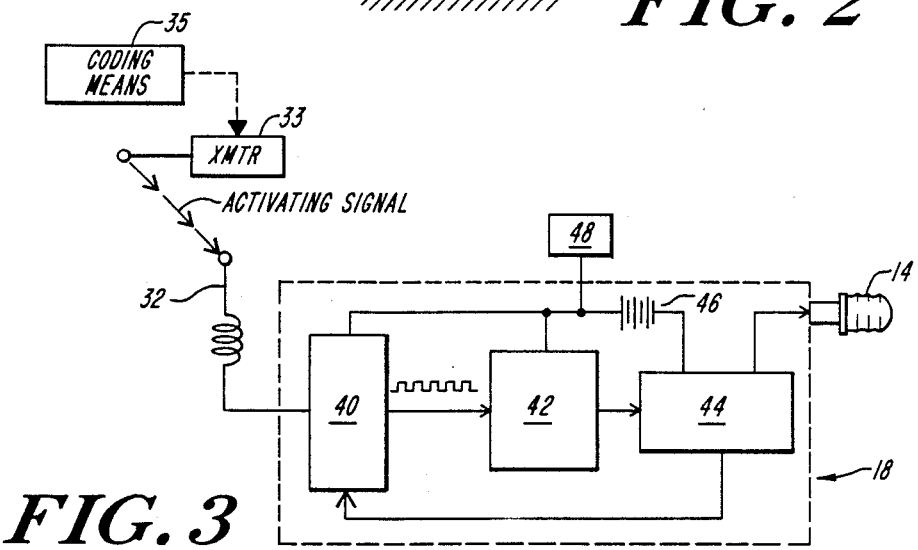
FIG. 3 is a block diagram of an external transmitter and an electronic subsystem marine transponder system according to the present invention.

Referring now to FIG. 3, there is illustrated a remote transmitter for broadcasting an activating signal on a predetermined frequency and a block diagram of an electronic subsystem utilized in the marine transponder system shown in FIGS. 1 and 2. The electronic subsystem includes an RF receiver 40, an optional decoder 42, timing and control circuitry 44, and a power source 46.

The activating signal may be broadcast using a dedicated low power transmitter 33 operating at one of the frequencies typically used in remote activation systems, for example, garage door opening systems. Such a system would be particularly advantageous for marine transponder systems used in conjunction with mooring, docking or slip facilities in precluding inadvertent activation or interference from maritime communication broadcasts. As a further alternative, any other FCC approved frequency may be used.

Alternatively, the activating signal for the marine transponder system 10 or 20 may be broadcast on one of the maritime mobile communication frequencies authorized by the FCC since many vessels already have FM marine radio communication equipment installed. Alternatively, vessel owners may see the advantage in purchasing such marine radio equipment since such equipment may be used for ship-to-shore or ship-to-ship communications as well as to activate marine transponder systems according to the present invention.

The RF receiver 40 is tuned to a predetermined frequency as exemplarily disclosed in the preceding paragraphs. Upon receipt of a signal transmitted at the predetermined frequency, the RF receiver processes the signal and passes the signal for further processing within the electronic subsystem.

In one preferred embodiment of the present invention, each marine transponder system is identified by a unique or quasi unique address so as to eliminate or reduce inadvertent actuation of non-addressed marine transponder systems. Individual transponder systems may have a unique address, or a group of marine transponder systems marking a limited area such as a channel or hazard region, or a mooring, docking or slip facility may all have the same address. For activating aids to navigation it may not be necessary to code the signals since mariners might desire to activate all aids within the range of the transmitter.

Generation of a coded signal may be accomplished by sequential keying of the remote transmitter. Alternatively, a black box assembly 35 may be integrated into the remote transmitter to generate a coded signal. The black box would cause the coded address to be modulated onto the selected transmitter frequency in any of various conventional ways.

Alternatively, the marine transponder system is responsive to any unencoded signal transmitted at the predetermined frequency. The unencoded marine transponder system would have particular utility in EPIRBs and other emergency signaling devices where rescue craft may not have access to coded addresses. Additionally, such systems would have utility for navigational buoys or docking facilities intended to be accessed by transient vessels. In this embodiment, the optional decoder 42 is eliminated or bypassed in the diagram of FIG. 3 such that a signal transmitted on the predetermined frequency is processed by the RF receiver 40 and passed directly to the timing and control circuitry 44.

Upon receipt of a properly decoded signal at the predetermined frequency by the decoder 42, or an uncoded signal transmitted at the predetermined frequency, a control signal is generated and transmitted to the timing/control circuitry 44. The timing and control circuitry 44 is used to effect a number of different functions. For example, the timing/control circuitry 44 may be used to periodically activate and deactivate the RF receiver 40. By activating the RF receiver 40 only periodically, additional energy savings are accomplished by the marine transponder system according to the present invention. By way of example only, the timing/control circuitry 44 may activate the RF receiver 40 for a fifteen millisecond period every five seconds.

The timing/control circuitry 44 also provides an activation signal to cause the power source to be electrically interconnected to the signal source 14 in response to a valid received signal. The signal source 14 is normally electrically isolated from the power source 46.

In one preferred embodiment, the timing/control circuitry 44 clocks the time from receipt of a valid signal. After a predetermined time has elapsed, the timing circuitry 44 will disconnect the power source 46 from the signal source 14. The timing/control circuitry 44 can also include appropriate circuitry to control the signal source 14 to cause it to broadcast a signal in a predetermined pattern.

The power source 46 for the marine transponder system is typically a battery. The battery may be a primary battery or a rechargeable battery. For an embodiment employing a rechargeable battery as the power source 46, the marine transponder system would also include one or more recharging means 48. The recharging means 48 provides a trickle current to the battery to maintain the battery at an optimal power level. The recharging means 48 may be solar cells 50 associated with the upper body 26 or the float 24 and/or a wave action generator 52 associated with the lower body 22. In the case of a marine transponder system associated with a land structure power, source 46 may be an AC power source.

The signal source 14 can be configured to broadcast an omni-directional or limited sector signal, and the signal may be a continuous signal, a repeating ON-OFF signal, or a signal broadcast in a predetermined pattern, depending upon the particular application. The signal source 14 may be a light, an audible horn, a radio broadcast, or any combination thereof, depending upon the application.

For example, buoys would typically broadcast an omni-directional flashing light pattern as the primary signal, and possibly an omni-directional, repetitive ON-OFF audible tone as the secondary signal. A marine transponder system used in combination with a mooring, docking or slip facility, however, would utilize a limited sector light signal as the primary signal, with the light signal being either continuous, repetitive ON-OFF, or flashing in a predetermined pattern.

A marine transponder system used as an EPIRB or other emergency signaling device, in contrast, would typically use an omni-directional radio broadcast as the primary signal. The radio signal would be broadcast at a predetermined frequency typically monitored by the Coast Guard or other rescue craft, and may be broadcast in a predetermined pattern such as an SOS, or a continuous or repetitive ON-OFF signal to facilitate triangulation or ADF. A light signal or an audible signal, or both, can be utilized as a secondary signal in combination with the primary radio signal.

A variety of modifications and variations of the present invention are possible in light of the above teachings. It is therefore to be understood that within the scope of the following claims, the present invention may be practiced otherwise than as specifically described hereinabove.

I claim:

1. A marine transponder system activated in response to a transponder activating signal broadcast by a remote transmitter, comprising:
   receiver means tuned for receiving and processing the transponder activating signal transmitted by operator activation of the remote transmitter;
   means for recognizing that the transponder activating signal has been received and for providing a control signal in response thereto;
   a housing for said receiver means and said recognizing means, said housing configured for use in a marine environment;
   signaling means for providing a predetermined recognizable signal to alert the remote transmitter to the presence and relative location of said marine transponder system; and
   timing/control means disposed in said housing and coupled to said signaling means and operative in response to said control signal for causing said signaling means to be energized for a predetermined period of time to provide said predetermined recognizable signal.

2. The marine transponder system of claim 1 further comprising a power source to provide energizing power for said receiver means, said recognizing means, said timing/control means and said signaling means.

3. The marine transponder system of claim 2 wherein said power source is a primary battery.

4. The marine transponder system of claim 2 wherein said power source is a rechargeable battery, and wherein said marine transponder system further comprises means for recharging said rechargeable battery.

5. The marine transponder system of claim 4 wherein said recharging means comprises solar energy utilization means for converting solar energy into electrical energy to recharge said rechargeable battery.

6. The marine transponder system of claim 4 wherein said recharging means comprises wave action generator means for converting wave motion energy into electrical energy to recharge said rechargeable battery.

7. The marine transponder system of claim 2 wherein said control signal causes said timing/control means to connect said signaling means to said power source for said predetermined period of time to cause energization of said signaling means to emit said predetermined recognizable signal in a predetermined pattern and wherein said timing/control means disconnects said signaling means from said power source after said predetermined period of time has elapsed.

8. The marine transponder system of claim 7 wherein said predetermined recognizable signal is a light signal of predetermined directional characteristic.

9. The marine transponder system of claim 8 wherein said predetermined pattern of said light signal is a flashing pattern.

10. The marine transponder system of claim 7 wherein said recognizable signal is an audible signal.

11. The marine transponder system of claim 7 wherein said predetermined recognizable signal is a radio signal of a predetermined directional characteristic.

12. The marine transponder system of claim 11 wherein said predetermined pattern of radio signal is a distress signal.

13. The marine transponder system of claim 1 wherein said receiver means is coupled to and operative under control of said timing/control means to be periodically operative and inoperative.

14. The marine transponder system of claim 1 wherein said marine transponder system includes a coded address, wherein the transponder activating signal includes a coded address signal portion corresponding to said coded address of said marine transponder system, and wherein said recognizing means is operative to recognize the coded address signal portion in the transponder activating signal and to provide said control signal in response thereto.

15. The marine transponder system of claim 1 wherein said housing includes a buoy.

16. The marine transponder system of claim 1 wherein said housing includes means for accommodating installation of said housing on a maritime structure.

17. The marine transponder system of claim 1 wherein said housing includes means for accommodating installation of said housing on floatation gear.

18. The marine transponder system of claim 1 wherein said housing includes means for accommodating installation of said housing on a boat.

19. A marine transponder system having a coded address activated in response to a coded transponder activating signal broadcast on a predetermined frequency by a remote transmitter, comprising:
   housing means for packaging said marine transponder system in a usable configuration to function in a marine environment;
   receiver means tuned to the predetermined frequency for receiving and processing the coded transponder activating signal transmitted on the predetermined frequency by the remote transmitter to provide coded information of the coded transponder activating signal as an output signal;
   decoding means for comparing said coded information output signal with said address code of said marine transponder system and for providing a control signal when said coded information output signal corresponds to said address code of said marine transponder system;
   signal means for providing a predetermined signal output in a predetermined pattern to alert the remote transmitter to the presence and location of said maritime transponder system; and
   timing/control means coupled to said signaling means and operative in response to said control signal for causing said signaling means to be energized for a predetermined period of time to provide said predetermined recognizable signal.

20. The marine transponder system of claim 19 wherein said housing means includes
   means for mounting said housing on an existing maritime structure, said package having said receiver means, said decoder means and said timing/control means disposed therein; and
   antenna means, integrated with said housing means, for supplying said receiver means with the coded transponder activating signal.

21. The marine transponder system of claim 19 wherein said housing means includes:
   a standalone buoy, said standalone buoy including:
      a lower body,
      a float attached to said lower body to buoyantly support said standalone buoy in the water,
      an upper body attached to said float to protrude upwardly from the surface of the water, said upper body having an antenna for providing said receiver means with the coded transponder activating signal transmitted on the predetermined frequency by the remote transmitter, and wherein said signal means is attached to said upper body at an upper portion thereof, and a stabilization member attached to said lower body to stabilize said standalone buoy in the water such that said upper body and said light source means protrude generally vertically above the surface of the water.

22. The marine transponder system of claim 2 wherein said power source is an AC power source.

* * * * *

UNITED STATES PATENT AND TRADEMARK OFFICE
CERTIFICATE OF CORRECTION

PATENT NO. : 4,903,243

DATED : February 20, 1990

INVENTOR(S) : John H. Turner, Jr.

It is certified that error appears in the above-identified patent and that said Letters Patent is hereby corrected as shown below:

On the title page:

In the Abstract, on the 16th line, "add-on adapted" should read --add-on package adapted--.

Signed and Sealed this

Twenty-eighth Day of July, 1992

Attest:

DOUGLAS B. COMER

*Attesting Officer*   *Acting Commissioner of Patents and Trademarks*